(12) United States Patent
Kellis (10) Patent No.: US 11,287,306 B2
(45) Date of Patent: Mar. 29, 2022

(54) LUGGAGE AND INTEGRATED WEIGHING SYSTEM FOR WEIGHING LUGGAGE ON HARD OR SOFT SURFACES IN REAL TIME

(71) Applicant: Esmartluggage Pty Ltd, Broadmeadows (AU)

(72) Inventor: George Kellis, Broadmeadows (AU)

(*) Notice: Subject to any disclaimer, the term of this patent is extended or adjusted under 35 U.S.C. 154(b) by 53 days.

(21) Appl. No.: 15/487,156

(22) Filed: Apr. 13, 2017

(65) Prior Publication Data

US 2017/0219418 A1     Aug. 3, 2017

Related U.S. Application Data

(63) Continuation of application No. 14/413,999, filed as application No. PCT/AU2013/000767 on Jul. 10, 2013, now abandoned.

(30) Foreign Application Priority Data

| Jul. 10, 2012 | (AU) | ................................ 2012902960 |
| Mar. 18, 2013 | (AU) | ................................ 2013900940 |
| Apr. 12, 2013 | (AU) | ................................ 2013204909 |

(51) Int. Cl.
| G01G 19/52 | (2006.01) |
| G01G 19/58 | (2006.01) |
| A45C 5/03  | (2006.01) |
| A45C 13/28 | (2006.01) |

(52) U.S. Cl.
CPC .............. *G01G 19/52* (2013.01); *A45C 5/03* (2013.01); *A45C 13/28* (2013.01); *G01G 19/58* (2013.01)

(58) Field of Classification Search
CPC .......... G01G 19/52; G01G 19/58; A45C 5/03; A45C 13/28
See application file for complete search history.

(56) References Cited

U.S. PATENT DOCUMENTS

| 7,084,357 | B2* | 8/2006  | Roberts   | A45C 15/00 177/131 |
| 7,265,302 | B2* | 9/2007  | Keech     | A45C 15/00 177/131 |
| 7,439,456 | B2* | 10/2008 | Ogunnaike | A45C 13/00 177/148 |
| 8,653,385 | B2* | 2/2014  | Li        | A45C 5/14 177/245 |
| 9,448,099 | B2* | 9/2016  | Zhao      | A45C 15/00 |
| 9,888,756 | B2* | 2/2018  | Shah      | A45C 13/18 |
| 10,039,362| B2* | 8/2018  | O'Hare    | A45C 15/00 |

(Continued)

*Primary Examiner* — Randy W Gibson
(74) *Attorney, Agent, or Firm* — Benjamin Aaron Adler (57) ABSTRACT

Provided is a luggage and integrated weighing system for weighing luggage on hard or soft surfaces in real time. A luggage case includes a body structure for receiving and holding articles for transport where the body has a closure means on a portion thereof for opening and closing the body to allow insertion and removal of luggage articles. The luggage case includes at least one weigh body mounted to a portion of the body structure, a weigh sensor housing, a weigh sensor mounted within the weigh sensor housing calibrated to determine weight of the luggage case, and a ground engaging member adjustably mounted within the weigh housing that is movable between a weighing condition and a non-weighing condition.

4 Claims, 9 Drawing Sheets

(56) References Cited

U.S. PATENT DOCUMENTS

| | | | |
|---|---|---|---|
| 2005/0217903 A1* | 10/2005 | Roberts | A45C 15/00 177/245 |
| 2005/0217904 A1* | 10/2005 | Hughes | A45C 15/00 177/245 |
| 2017/0219417 A1* | 8/2017 | Lee | G01G 3/00 |

* cited by examiner

LUGGAGE AND INTEGRATED WEIGHING SYSTEM FOR WEIGHING LUGGAGE ON HARD OR SOFT SURFACES IN REAL TIME

CROSS-REFERENCE TO RELATED APPLICATIONS

This continuation application claims benefit of priority under 35 U.S.C. § 120 of pending application U.S. Ser. No. 14/413,999, filed Jan. 9, 2015, which is a national stage application under 35 U.S.C. 371 of international application PCT/AU2013/000767, filed Jul. 10, 2013, now abandoned, which claims benefit of Australian patent application AU2013204909, filed Apr. 12, 2013, of Australian patent application AU2013900940, filed Mar. 18, 2013, and of Australian patent application AU2012092960, filed Jul. 10, 2012, the entirety of all of which are hereby incorporated by reference.

BACKGROUND OF THE INVENTION

Field of the Invention

The present invention relates to luggage and more specifically to the weighing of luggage in real time. More particularly the present invention relates to an improved integrated luggage and weighing system which enables efficient weighing of luggage in real time and on hard or soft surfaces.

In today's global society, domestic and International travel is exceptionally common both for commerce or recreation. Stricter international legislation and airline policies however have meant that for persons involved in the handling of luggage there must be an increased awareness of both weight and security of luggage transportation. Tougher OH&S laws also limit the weight that airline employees can carry.

The ability to easily and accurately measure the weight of luggage has taken on increased importance for both travellers and passenger transports including airlines, trains, buses and the like. At airports for example, a weight limit now applies for each piece of luggage. Many airlines typically charge, or apply a surcharge to, passengers for weight of their luggage which exceeds the weight limit.

While it could be said that the weight limit applied by airlines is meant as a practical measure to limit potential injury to an employee, and risk of litigation, a passenger may opt to pay the excess weight surcharge, in which case an airline employee may not know the weight of luggage until he/she tries to lift and move the luggage. An employee is therefore still exposed to potential injury as a result of not knowing the weight of the luggage.

From a passenger's perspective, to avoid an excess weight charge at a typical airport check-in, the passenger must either find a way to reduce the weight and contents of the luggage, perhaps by opening and discarding items, or pay for an additional piece of luggage. With recent increases in security measures, and concomitant time constraints, passengers faced with the dilemma of excess luggage weight have been known to miss a scheduled flight and as a result suffer even greater inconvenience and expense.

To help address the problem associated with luggage weight, passengers have commonly resorted to a domestic weighing scale available at home to weigh luggage before leaving for a trip. Presuming that most passengers have access to a home weigh scale, such as a bathroom scale, placing bulky luggage bags on a typical home scale has its practical drawbacks. One particular drawback is that each time the luggage needs to be weighed with a conventional home scale, the suitcase or bag must be closed before placing it on the small-sized scale.

This means that there is no continuous means of weighing luggage without the passenger opening and closing the suitcase and placing the luggage onto a weigh scale. If for example, a piece of luggage has been tampered with, that is, items removed or added by a person other than the passenger and without the passenger*s/owner's knowledge, absent the ability to have access to a weigh scale, this has the potential of placing the passenger at risk of breaching security within domestic or international borders.

Other drawbacks include the situation where luggage may be much larger and bulkier in size than the scale causing the display of the scale to be obscured by the luggage. It is also difficult to place luggage on a home scale and to keep it steady without holding it and thereby affecting the weight measurement. What is needed is a method by which a passenger can weigh luggage as it is being packed, to make sure that it fits within required weight limits before it is taken to the airport or location for transport.

Various designs of luggage scales are currently produced that allow a user to measure the weight of their luggage especially given the increased restrictions from airlines on the number of checked bags. One such device is basically a fish-scale, which allows a user to attach a suitcase by its handle to a strap which is attached to a load-cell with another handle built in. When the user picks up the suitcase via the scale, a digital readout will indicate the total weight. One disadvantage of this product is that the user has to repeat the cycle of adding or subtracting items from the bag, closing the zipper and hanging the scale over and over again until a desired weight is achieved. A further disadvantage is that a user has to store the scale during non-use, and the user is required to physically lift the bag by the handle of the scale in order to register the weight of the piece of luggage on the scale.

A modification of this luggage scale includes luggage with the fish-scale idea built in to the suitcase handle. While it may be convenient because the user does not have to worry about forgetting the scale at home or lose it while travelling, a user desiring to obtain a weight measurement, must nevertheless add or subtract items from the luggage, close the suitcase/bag and hold the bag up by the handle in order to obtain a weight measurement. U.S. Pat. No. 7,692, 107 issued to Shotey et al. discloses luggage with weight scale built in to a luggage frame comprising a frame assembly having a first frame and second frame wherein the first frame is substantially coextensive with and coupled to the second frame; at least one load sensor disposed between the second frame and the first frame; and wherein the luggage is weighed when the second frame is oriented parallel to and facing a horizontal surface so that supporting feet and wheels engage the surface.

While the disclosed weight measuring device performs the task at hand, the weight measurement is inaccurate if weighing is performed on soft surface because the surface absorbs some of the weight of the luggage.

There is thus a need for an improved luggage weighing device which can (a) allow a passenger to weigh luggage as it is packed, and (b) allow weighing on soft or hard surfaces.

Even further, when luggage is checked in at an airport for example, historically a relatively high proportion of the luggage may not reach its desired destination and cannot be easily located. The result of lost luggage or mishandled luggage costs the air transport industry an estimated $2.5 billion a year, which equates to about $100.00 per piece of mislaid luggage. While steps are being taken to reduce the rate of lost or mislaid luggage, further improvements are necessary to reduce this rate of loss. It is therefore an object of the present invention to ameliorate one or more of the disadvantages of the prior art. A further object of the present invention is to provide the public with a useful alternative.

SUMMARY OF THE INVENTION

In the present invention there is disclosed a luggage and integrated weighing system for weighing luggage on hard or soft surfaces in real time, the system including:

a luggage case including a body structure for receiving and holding articles for transport, the body having a closure means on a portion thereof for opening and closing the body to allow insertion and removal of luggage articles;

at least one weigh body mounted to a portion of the body structure, the weigh body including:
a weigh sensor housing;
a weigh sensor mounted within the weigh sensor housing calibrated to determine weight of the luggage case;
a ground engaging member adjustably mounted within the weigh housing movable between a weighing condition and a non-weighing condition, wherein in the weighing condition a first portion of the ground engaging member engages the weigh sensor for weighing the luggage case, and a second portion engages the ground such that a force proportional to the weight of the luggage is exerted on the weigh sensor;
a power circuit including a microprocessor attached to the at least one weigh sensor, whereby the microprocessor is programmed to receive input information from the at least one weigh sensor(s) in a weigh condition;
a display means attached to an external surface of the body portion, the display means being interconnected to the microprocessor for receiving and displaying weigh information; and
wherein in a weigh condition the weigh sensor(s) completes the power circuit and the weight of the luggage is determined by the weigh sensor and a weight measurement is displayed on the display means, and wherein in a non-weighing condition the ground engaging member is adjustably disengaged from the weigh sensor.

The present invention provides travellers with an improved means of determining luggage weight compliance while travelling, prior to having baggage rejected or additional fees assessed at the baggage check counter at an airport or the like. Compared to the prior art weighing systems, the improved luggage weighing system of the invention can be used for determining weight of luggage in real time and on hard or soft surfaces. This represents an improvement over the prior art which is limited to weight determination on hard floors only.

The second portion of the ground engaging member at least partially lifts the luggage case into weighing engagement with the sensor whereby the weight of the luggage including articles within the body portion of the luggage is determined and displayed substantially independent of hard or soft surfaces. When contact occurs between the ground engaging member and weigh sensor in a weighing condition, the power circuit is completed and measurement of weight provided by the weigh sensor.

The weigh body can further include a guide means for aligning and locating the first portion of the ground engaging member in engagement with the sensor in a weigh condition. The guide means can include mating components on the weigh sensor housing and the ground engaging member which bias the first portion of the ground engaging member towards engagement with the weigh sensor in a weigh condition.

The ground engaging member can include a ground engaging head and dependent legs, wherein the legs are slidably received within the weigh sensor housing and whereby the head lies adjacent the weigh sensor housing in a non-weigh condition with the legs resting adjacent the weigh sensor. In one embodiment the, ground engagement means can be retracted from a weighing condition to a non-weigh condition in which the head portion can provide support for stably resting the luggage case on the ground. In a weigh condition the leg portion of the ground engaging member extend from the weigh sensor housing and slidably brought into alignment with the weigh sensor, and whereby the head portion is elevated away from the weigh sensor housing for positive engagement with the ground.

The head portion of the ground engaging member can include a releaseable locking means whereby the head portion is releasably seated adjacent the weigh housing in a non-weighing condition. The releasable locking means can include a depression member in the head portion biased towards a locking condition whereby in a non-weigh condition the depression member engages a shoulder portion on the weigh housing so as to lock the head portion adjacent the weigh housing.

In a related aspect of the present invention there is disclosed an improved luggage and integrated weighing system for weighing luggage on hard or soft surfaces in real time including:

a transportable luggage case for receiving articles of clothing and the like, the case having a base portion on which ground engaging members such as wheels or feet are mounted;

a housing attached to the base;
a carry handle attached to the housing;
a weighing system comprising at least one load sensor operatively connected to the base, the at least one load sensor being configured to move relative to the base between a stored condition and an operating condition;

wherein in an operating condition the at least one load sensor is configured to extend below the base portion sufficiently to engage the ground and raise the wheels or feet from frictional engagement with the ground for measuring weight of the luggage, and wherein in a stored condition the at least one sensor is configured to allow engagement of wheels or feet with the ground for transport of luggage.

The present invention provides travellers with an improved means of determining luggage weight compliance while travelling, prior to having baggage rejected or additional fees assessed at the baggage check counter at an airport or the like.

At any time during travel, the weight of luggage can be readily checked to substantially avoid tampering hence luggage security is improved. Compared to the prior art weighing systems, the improved luggage weighing system of the invention can be used for determining weight of luggage in real time and on hard or soft surfaces. This represents an improvement over the prior art which is limited to weight determination on hard floors only.

The weighing system can include at least one variable geometry foldable device attached to the base comprising a plate portion mounted to a portion of the base and a load sensor pivotally connected to the plate such that the load sensor is pivotally movable between a stored condition in a horizontal plane relative to and adjacent the plate, and an operating condition in which the load sensor is positioned immediately underneath/adjacent the plate in a vertical plane with the plate so as to raise the base and engage the ground for weighing luggage contents.

Preferably the variable geometry foldable device is removably attached to the base.

Preferably the weighing system includes at least a pair of variable geometry foldable devices spaced apart on the base portion to both allow weighing of luggage and stabilize the luggage during weighing.

In an alternative embodiment, the weighing system can include a rail system having a longitudinal body portion attached to the base and extending within the housing, and an opposite pair of shoulders integral to the body portion, whereby the opposite shoulders connect to the base and extend externally of the housing, and wherein the longitudinal body portion includes a pathway or track along which one or more load sensors can be moved between a stored condition on or in the longitudinal body portion and a weighing condition in which the one or more load sensors are moved adjacent the shoulder portion(s), whereby in the weighing condition the combined height of the load sensor and shoulder raise the wheels or feet away from frictional engagement with the ground, and allow weighing of luggage contents.

In a related aspect of the present invention there is disclosed an improved luggage and integrated weighing system for weighing luggage on hard or soft surfaces in real time including:

a transportable luggage case for receiving articles of clothing and the like, the case having a base portion on which ground engaging members such as wheels or feet are mounted;

a housing attached to the case;

a handle telescopically interfitting within the housing, wherein the handle is moveable between an extended and retracted position within the housing;

at least one first load sensor operatively connected to the housing wherein when the handle is extended from the housing the at least one first load sensor is engaged for measuring weight of the luggage in a first weighing condition; and at least one second load sensor mounted between the base and the ground engaging member(s), wherein the at least one second load sensor is operable for measuring weight of the luggage in a second weighing condition.

The present invention provides travellers with an improved means of determining luggage weight compliance while travelling, prior to having baggage rejected or additional fees assessed at the baggage check counter at an airport or the like. Compared to the prior art weighing systems, the improved luggage weighing system of the invention can be used for determining weight of luggage in real time and on hard or soft surfaces. This represents an improvement over the prior art which is limited to weight determination on hard floors only.

The luggage weighing system can include a micro-processor unit (MCU) operatively coupled to the first and second load sensors wherein the MCU receives input data from the at least one first and at least one second load sensor(s) in the first or second weighing condition respectively, and calculates weight of the luggage. The case can include a display screen operatively coupled to the MCU wherein weight measurement calculated by the MCU can be displayed. The display can be configured to display weight measurements in metric or imperial units. The display and MCU can be powered by a power source such as a lithium battery.

The improved luggage weighing system can include a selection means for selectively operating the first or second load sensor. Depending on the weighing conditions, the selection means can selectively actuate the First or second load sensor.

In a related aspect, there is disclosed an improved luggage weighing system for weighing luggage on hard or soft surfaces in real time including:

a case, a housing attached to the case;

a telescoping handle adapted for extending or retracting within the housing;

a first and second load sensors, wherein the handle is operatively connected to the first and second load sensors; and wherein the first load sensor(s) are actuated to determine weight when said handle is in an extended position, and wherein the second load sensor(s) are actuated to determine weight measurement when the handle is in a retracted position.

The luggage weighing system can include an MCU operatively coupled to the at least one first and at least one second load sensor(s), wherein the MCU receives input data from the at least one first and at least one second load sensor(s) in the first or second weighing condition respectively, and calculates weight of the luggage.

The case can include a display screen operatively coupled to the MCU wherein weight measurement calculated by the MCU can be displayed.

In this embodiment of the invention, the handle selectively operates the load sensors. The first and second load sensors are preferably located relative to the handle and base portion of the case respectively. In a preferred form of the invention the at least one first load sensor is located on a portion of the retractable handle such that when the handle is fully extended relative to the housing the at least one load sensor is positively engaged with a base portion of the case or a top portion of the housing. Alternatively or in addition, the at least one first load sensor can be located on a portion of the housing whereby when the handle is extended from the housing at least a portion of the handle positively engages the at least one first load sensor and actuates weighing determination of the luggage.

In this weighing condition the handle actuates weighing operation of the at least one first load sensor, and a microprocessor unit calculates the weight and the weight measurement is displayed.

In a further preferred form, the at least one second load sensor is located between a base portion of the case and at least one surface engaging member mounted to the base, wherein when the handle is retracted relative to the housing and the at least one ground engaging member is resting on the ground, the at least one second load sensor is actuated for weighing determination.

The at least one first and second load sensor can include a plurality of load cells.

In a related aspect of the present invention there is described an improved luggage and integrated weighing system including:

a case assembly including a case for ingress and egress of articles such as clothes and the like on a plane or other mode of transport, a housing for receiving a telescoping handle, and ground engaging support members such as wheels and/or feet;

an integral weighing system for determining weight of the luggage, the weighing system including:
  at least one first load sensor located on the housing;
  at least one second load sensor located between a base portion of the case and one or more of the ground engaging members;
  a micro-processor unit operatively connected to the at least one first and second load sensors for converting load data into calibrated weight units;
  an LCD display operatively connected to the microprocessor unit, the display being located on a visible portion of the case for displaying weight measure determined and transmitted by the micro-processor, the display further including a mode switch to display weight measure in a selected scale of pounds, ounces or kilograms;
  a power source such as a rechargeable lithium battery for powering the micro-processor; and
  an actuator mechanism which allows activation of the weighing system, wherein the actuator includes an automatic off switch to conserve battery power;
  whereby when the handle is extended at least a portion of the handle positively engages the at least one first load sensor to actuate weighing determination in a first weighing condition on relative soft surfaces; and
  wherein when the ground engaging members rest on hard surface, weight of luggage can be determined by the at least one second load sensor.

In one broad aspect of the invention, there is provided a modified luggage or suitcase having:
  a body portion for receiving articles wherein the body portion includes a display screen;
  an integral weighing device mounted on or within the body for determining weight of articles within the body, and
    wherein when the weight of articles is determined the weight is displayed on the display screen.

In yet a further related aspect of the present invention there is disclosed a luggage and integrated weighing system for weighing luggage on hard or soft surfaces including:
  a body portion for receiving and holding articles for transport, the body portion having a base platform, and a means for opening and closing the body portion;
  a generally planar and substantially non-flexible plate member mounted on the base platform within the body portion;
  at least one weigh sensor(s) mounted on the plate whereby the at least one' weigh sensor is located between the plate and base platform in an operating condition;
  a microprocessor attached to the at least one weigh sensor, whereby the microprocessor is programmed to receive input information from the at least one weigh sensor(s) in an operating condition;
  a display means attached to an external surface of the body portion, the display means being interconnected to the microprocessor for receiving and displaying weigh information; and
  wherein the weight of articles within the body portion is determined when contact occurs directly or indirectly between articles in the body portion and the plate substantially independent of hard or soft surfaces.

The combination of the base platform and non-flexible plate allow weight measurement to be determined substantially independent of the surface on which the luggage is resting.

In a further related aspect of the present invention there is disclosed a luggage and integrated weighing system for weighing luggage on hard or soft surfaces including:
  a body portion for receiving and holding articles for transport, the body portion having a base platform, and a means for opening and closing the body portion; a pair of spaced apart sleeve members mounted underneath the base platform on an external surface of the body, the sleeve members being connected to power circuitry within the body portion including a microprocessor;
  a pair of weigh sensors, the each weigh sensor being slidably received within a sleeve member wherein in an operating condition the weigh sensors complete the power circuit;
  a display means attached to an external surface of the body portion, the display means being interconnected to the microprocessor for receiving and displaying weigh information; and
  wherein in a weigh condition the sleeve members contact a ground surface and allow weigh measurement of articles within the body portion.

In a further related aspect of the present invention there is disclosed a luggage and integrated weighing system for weighing luggage on hard or soft surfaces, the system including:
  a body structure for receiving and holding articles for transport, the body having a closure means on a portion thereof for opening and closing the body to allow insertion and removal of luggage articles;
  at least one weigh body mounted to a portion of the body structure, the weigh body including:
    a weigh sensor housing;
    a weigh sensor mounted within the weigh sensor housing;
    a foot member adjustably mounted within the weigh sensor housing being moveable between a weighing and non-weighing condition, wherein in the weighing condition a portion of the foot engages the weigh sensor;
  a microprocessor attached to the at least one weigh sensor, whereby the microprocessor is programmed to receive input information from the at least one weigh sensor(s) in a weigh condition;
  a display means attached to an external surface of the body portion, the display means being interconnected to the microprocessor for receiving and displaying weigh information; and
  wherein in a weigh condition the foot member extends at least partially from the weigh sensor housing to engage the ground, and whereby the weight of the luggage including articles within the body portion of the luggage is determined and displayed when contact occurs directly or indirectly between the foot member and weigh sensor substantially independent of hard or soft surfaces.

The weigh body can further include a holding means for locating the foot member in engagement with the sensor in a weigh condition. The holding means can include mating components on the weigh sensor housing and the foot member.

The foot member can include a ground engaging head and dependent legs, wherein the legs are adapted to slide within the weigh sensor housing and whereby the head lies adjacent the weigh sensor housing for resting on the ground in a non-weigh condition with the legs resting adjacent the weigh sensor, and in a weigh condition the legs extend from the weigh sensor housing engaging the weigh sensor and elevating the head above the weigh sensor housing for positive engagement with the ground, The luggage and integrated weigh system of the instant invention can include a caller identification means having a facility for recording owner contact details such as telephone and address, and a caller identification play means, wherein if luggage is lost and found by a third party, the caller identification play means can be actuated by the third party to play the owner details through an audio speaker on the display means. The caller identification means allows one way of contacting an owner in the event of lost or mishandled luggage.

The luggage and integrated weigh system can also include a telecommunications device such as a radio transmitter and receiver, wherein owner telephone details are recorded, and whereby transmission is actuated by a push button. In this embodiment the telecommunications device includes a GSM simcard, which dials luggage owner directly. This represents a more direct way of contacting owner of lost luggage by operating a pre-recorded simcard by GMS. In a further embodiment, the luggage and integrated weigh system can also include a GPS tracking device, and control means for transmitting GPS data at controlled or intermittent times. However during flight, because a GPS tracking system is required to be turned off, once landed the GPS device can transmit the last recorded position. The GPS tracking device can operate off the power source of the luggage system or can operate from a light sensitive power source so that the power will be automatically s witched off in low light conditions such as cargo holds, and power on upon exposure to sunlight. This allows the owner to track luggage or at least identify the last known position. Another advantage of this system is that aviation requirements are met because the GPS is adapted to power down when in flight.

Further exemplifications of the present invention will be described as follows with reference to the accompanying drawings. A brief description of the drawings follows.

DETAILED DESCRIPTION OF THE PREFERRED EMBODIMENTS WITH REFERENCE TO THE ACCOMPANYING DRAWINGS

Figure 1:
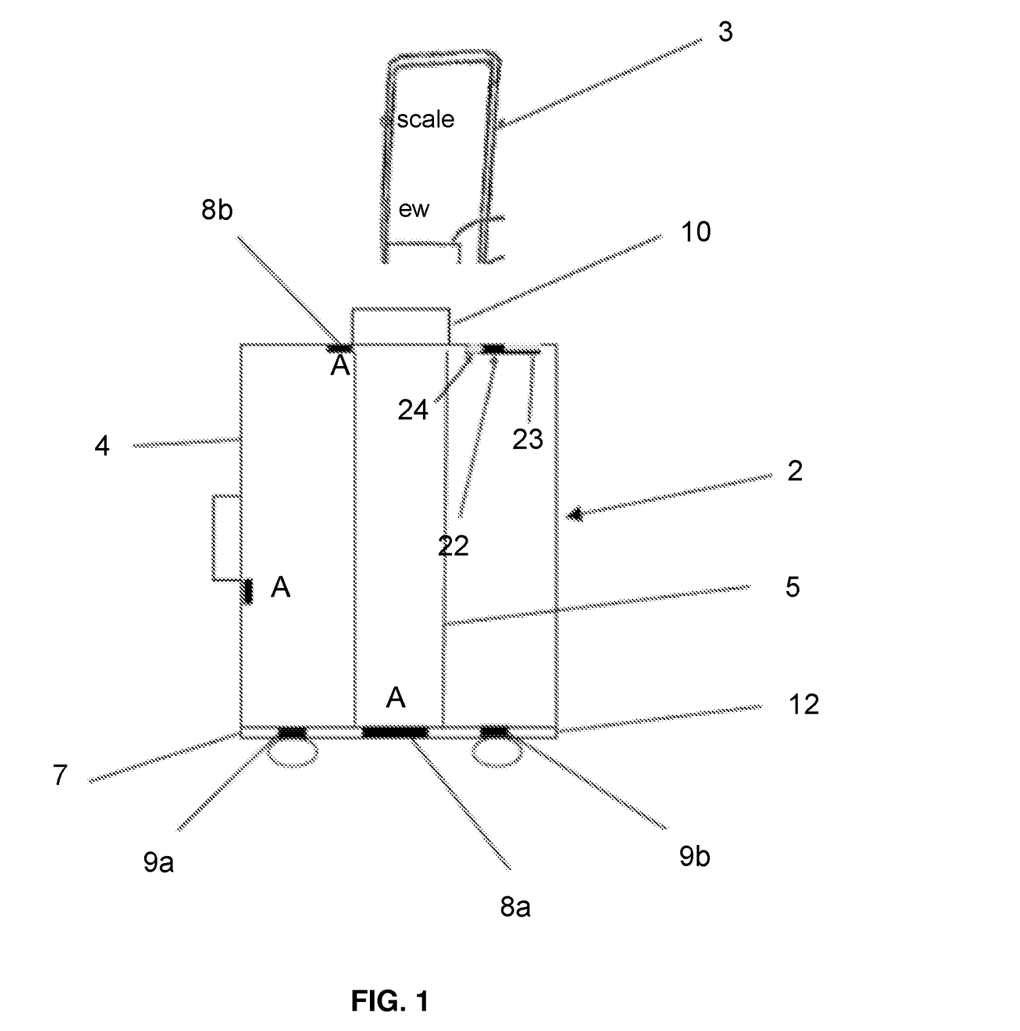
FIG. 1 is a cross-sectional schematic representation of one embodiment of the present invention in a second weighing condition.

Referring to FIG. 1 there is shown an improved luggage and integral weighing system 1 for weighing luggage on hard or soft surfaces according to one embodiment of the present invention. The improved weighing system for luggage broadly includes a carrying case assembly, according to principles of the invention, is generally indicated at 2 including a case 4, a telescoping handle 3 adapted for extending or retracting within a housing 5 attached to the case 4, first load sensors 8a, 8b and second load sensors 9a, 9b wherein the first load sensors are operably located for weighing determination in a first weigh condition, and wherein the second load sensors are operably located for weighing determination in a second weighing condition.

Figures 3, 4, 5:
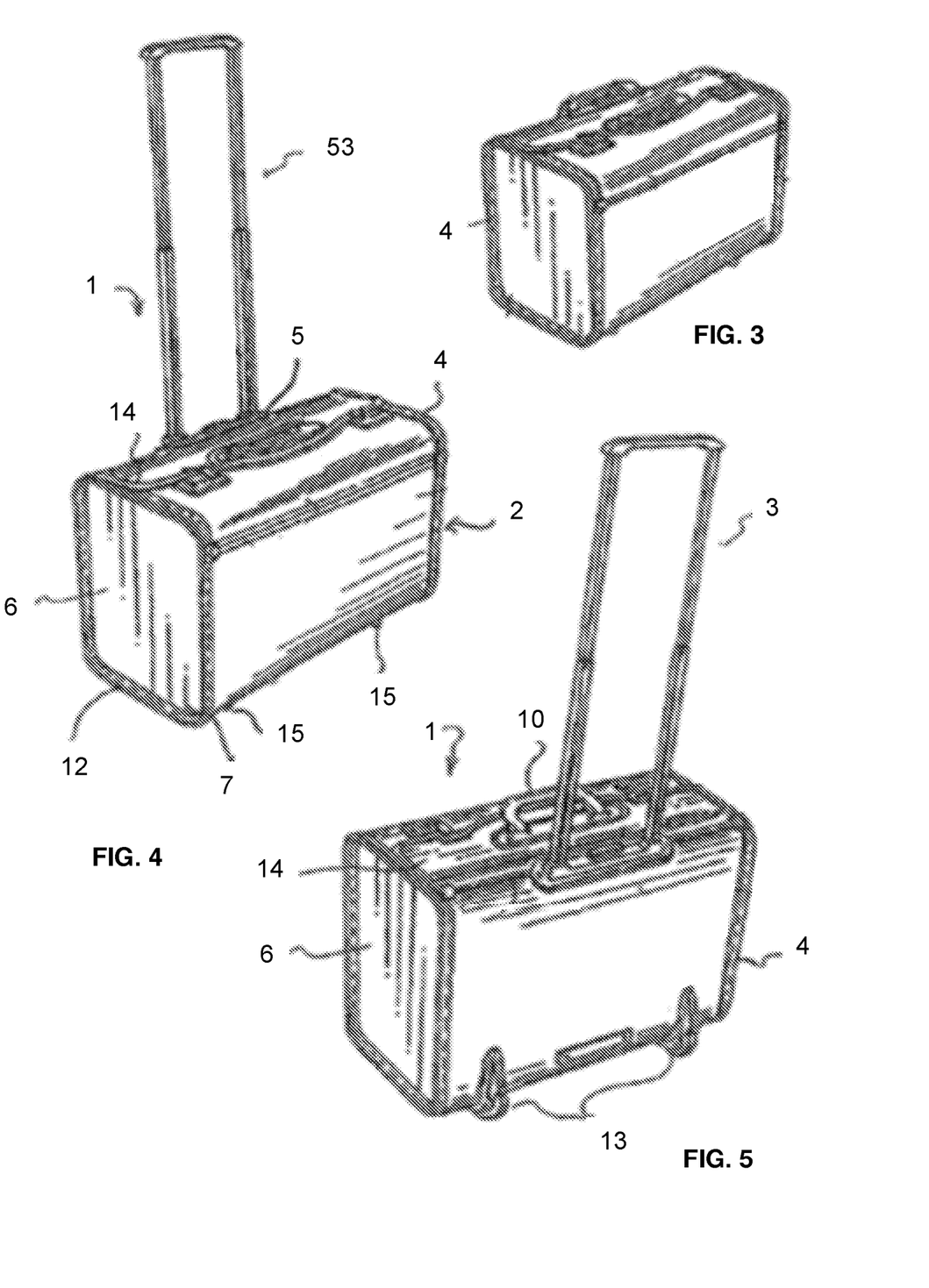
FIG. 3 is a partial front perspective representation of an embodiment of the present invention with handle in retracted position.
FIG. 4 is a partial front perspective representation of the embodiment in FIG. 3 with handle in extended position.
FIG. 5 is a partial rear perspective representation of the embodiment in FIG. 3 with handle in extended position.

As can be seen by comparing FIGS. 3 and 4, assembly 2 includes a case 4 for carrying items from place to place and a housing 5 is provided at a rear portion of the case 4 for receiving a built-in telescoping handle 3. The case 4 has a body with side walls 6, a floor 7, a handle 10, and a cover lid or flap(s) 14 which open to permit access to the interior of the case. The case assembly includes a base 12 beneath the floor 7 on which ground engaging wheels 13 and feet 15 are mounted on a rear portion and front portion of the case respectively.

As can be seen in the figures a handle assembly is located adjacent the rear wall of case 4. The handle assembly includes a housing 5 attached to the case 4 in which the telescoping handle 3 is operable between an extended and retracted position relative to the housing. As best seen in FIG. 1, first load sensors 8a and 8b are positioned relative to the housing 5 so that when the handle 3 is extended relative to the housing 5, at least a part of the handle positively engages first load sensors 8a or 8b or both in a first weighing condition.

In this embodiment the load sensors 8a and/or 8b are actuated to determine the weight of luggage on soft surfaces. In particular, positive engagement of at least a part of the handle with one or both of the first load sensors allows weighing of luggage on soft surfaces. In this weighing condition the case assembly may be sufficiently removed from direct contact with a ground surface so that an accurate weight measure of luggage can be performed by the first load sensors.

FIG. 1 also shows second load sensors 9a and 9b located between the base 12 and wheels 13 or feet members 15. Second load sensors 9a and 9b are operable in a second weighing condition when wheels 13 and feet 15 engage the ground. This is useful for weighing luggage on a hard surface where the wheels and or feet positively engage the second load sensors.

The improved luggage and weighing system 1 also includes a micro-processor unit 22 operatively connected to the first and second load sensors. The MCU receives data from the operable load sensors and converts load data into calibrated weight units.

Figure 2:
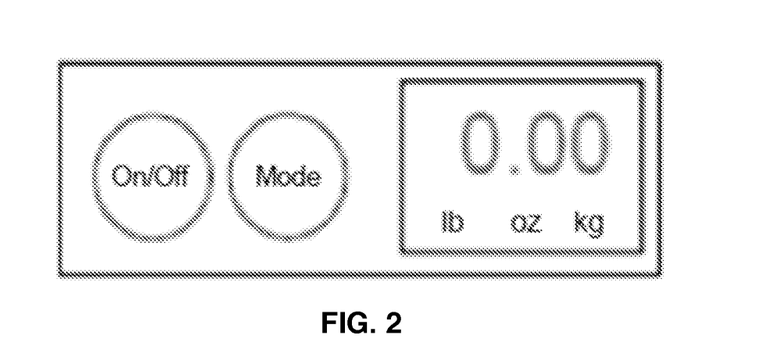
FIG. 2 is a top plan view of an LCD display and selection means for use in the embodiment of the present invention according to FIG. 1.

The case 4 in FIG. 1 shows an LCD display 23 located in a top portion. The display 23 (shown in FIG. 2) is operatively connected to the microprocessor unit, the display being located on a visible portion of the case for displaying weight measure determined and transmitted by the microprocessor, the display further including a mode switch to display weight measure in a selected scale of pounds, ounces or kilograms. The display is powered by a rechargeable lithium battery 24 and may include an automatic off switch 25 to conserve battery power. In one embodiment (not shown), the luggage and weighing system includes an actuator mechanism which allows selective operation of the first or second load sensors.

Figure 6:
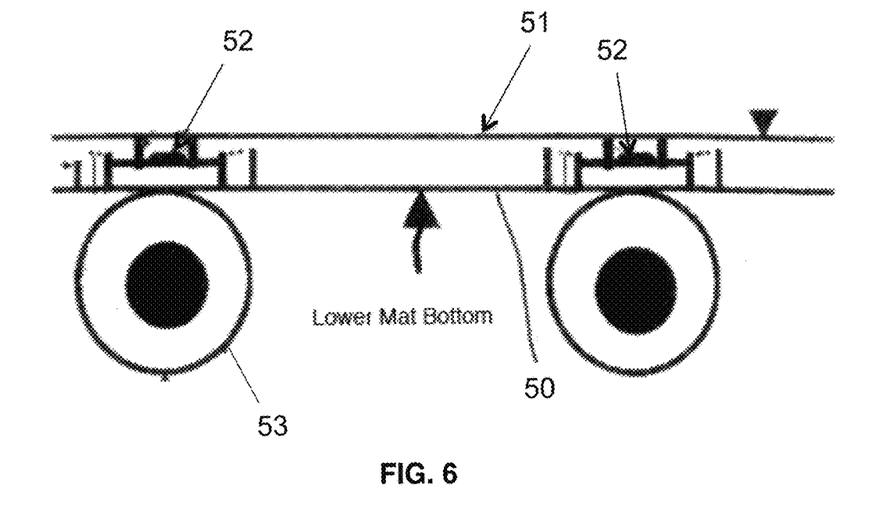
FIG. 6 is a schematic view in vertical cross-section of a further embodiment of the luggage and integral weighing system in accordance with the present invention.
Figure 7:
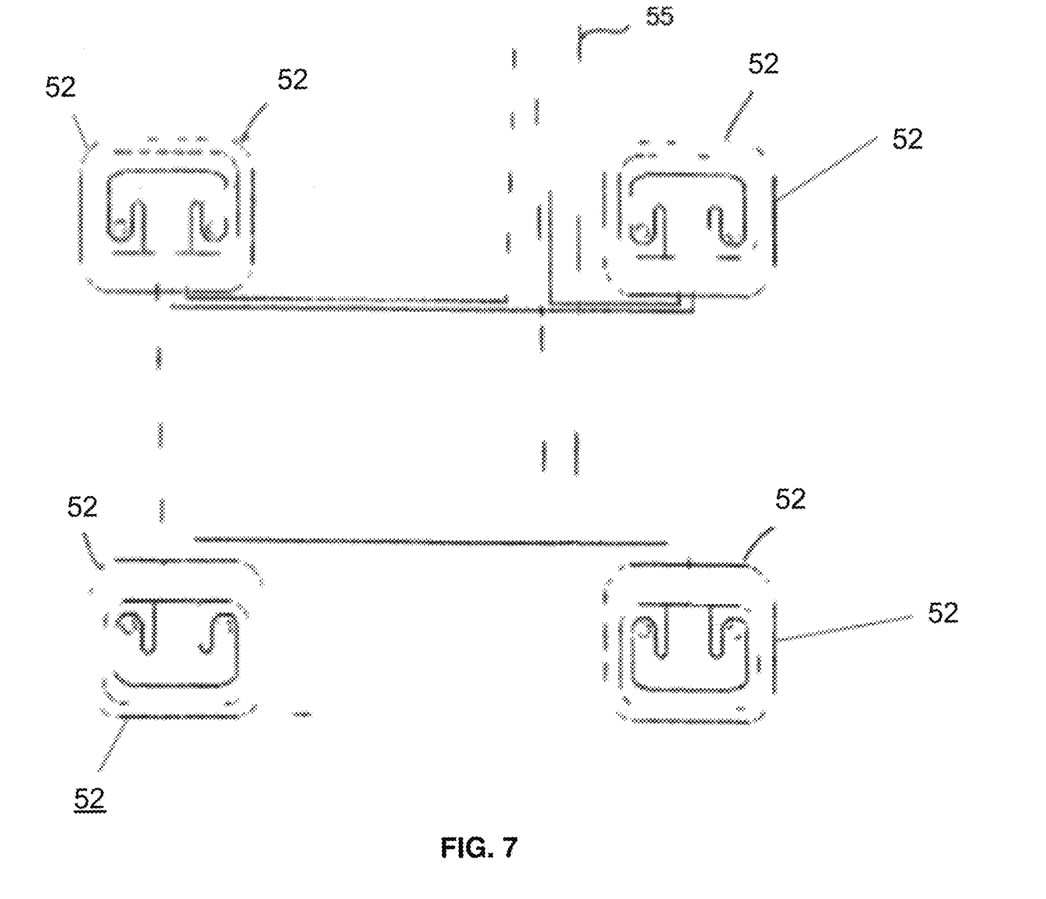
FIG. 7 is a schematic representation in plan view of a weigh system in accordance with FIG. 6 for use in luggage accordance with the present invention.

Referring to FIG. 6 there is shown a vertical cross-section of luggage and integral weighing system including a base platform 50 on which a non-flexible plastic plate 51 is mounted. A pair of weigh sensors 52 is shown mounted between the platform 50 and plate 51 in substantial alignment with external rollers 53. As shown in FIG. 7 the integral weighing system includes a plate 51 on which four weigh sensors are mounted. The sensors are interconnected to an LED display screen 54 by a printed circuit board (not shown) and electronic circuitry 55. The PCB includes a microprocessor which receives weigh information from the sensors in a weigh condition. The information is then relayed to the LED circuitry where it is displayed in conventional weigh units. The LED display includes selection means 56. As shown, the selection means includes a unit selection, and on/off switch and a zero tare.

Figure 8:
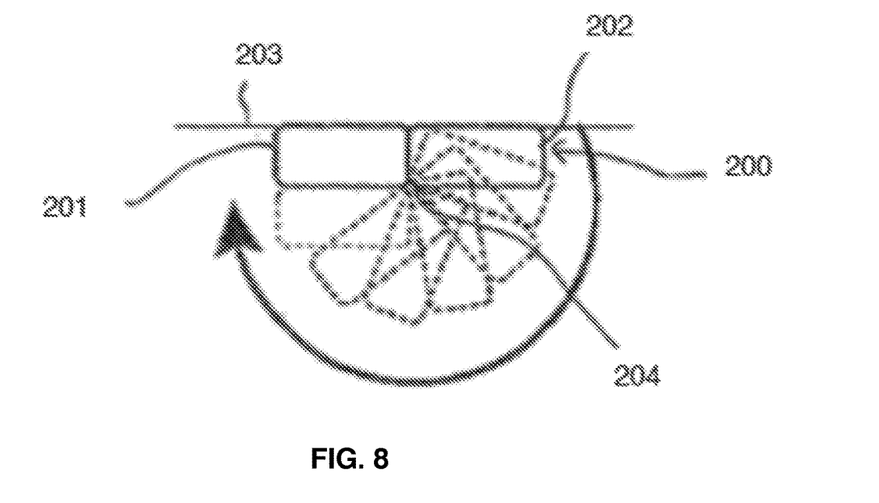
FIG. 8 is a schematic representation in vertical cross-section of a weigh system in accordance with one embodiment of the present invention.
Figure 9A:
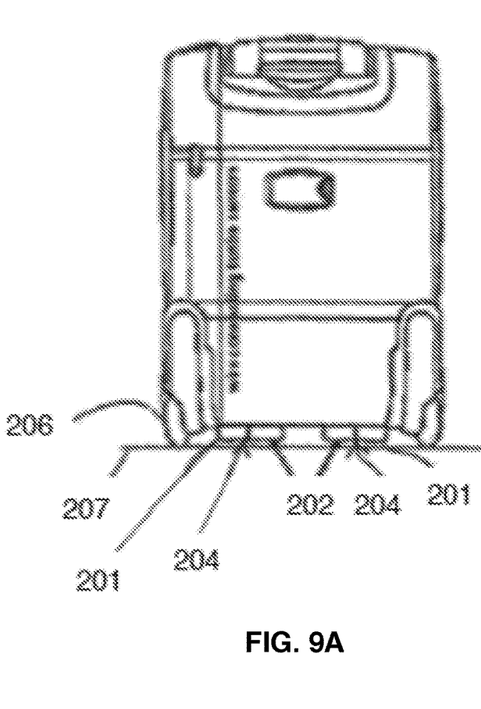
FIGS. 9A and 9B are a schematic representation in a side view of a weigh system in accordance with FIG. 8 showing different weighing configurations.
Figure 9B:
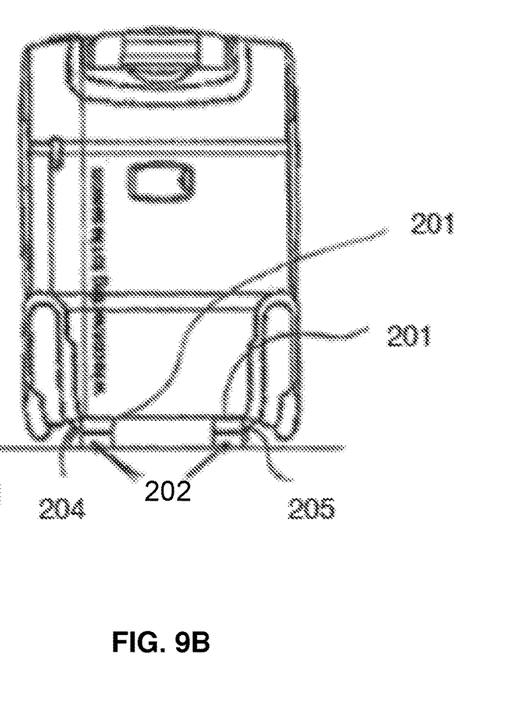
Figure 10:
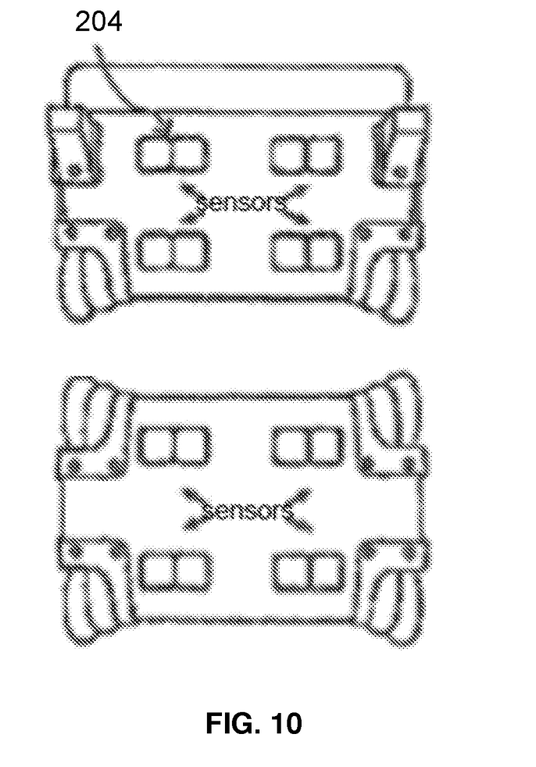
FIG. 10 is a schematic representation of FIG. 9 from underneath.

Referring to FIGS. 8, 9 and 10 there is shown a further preferred embodiment of the present invention including a variable geometry weighing system 200. In this embodiment (see FIG. 8) the system 200 shows a plate 201 mounted to an underneath portion of the base 203, and a load sensor 202 pivotally mounted to the plate 201 at pivot point 204.

As shown in FIG. 8 in solid outline, the weighing system 200 has the plate 201 and load sensor 202 aligned in a storage condition side by side in a horizontal plane. As shown in dotted outline, the load sensor 202 is pivotally moveable between the storage condition and a weighing condition in which the load sensor is located immediately below the plate 201 in vertical alignment.

Referring to FIGS. 9A and 9B there is shown the weighing system 200 in a storage condition and weighing condition respectively. As seen in FIG. 9B the weighing system includes a pair of variable geometry devices 204 and 205 including plate 201 and load sensor 202.

As shown in FIG. 9A, in a storage condition the configuration of the weighing system 204 and 205 allow the wheels to engage the ground 207. In FIG. 9B when the load sensors 202 are moved in vertical alignment with the respective plates 201, the increase in height raises the base and wheels from frictional engagement with the ground. In this condition the load sensors engage the ground and allow weighing of the luggage.

In a further preferred embodiment shown in FIG. 10, the weighing system can include at least four variable geometry weighing devices 204. This helps to stabilise the luggage for weighing in a weighing condition.

Figure 11:
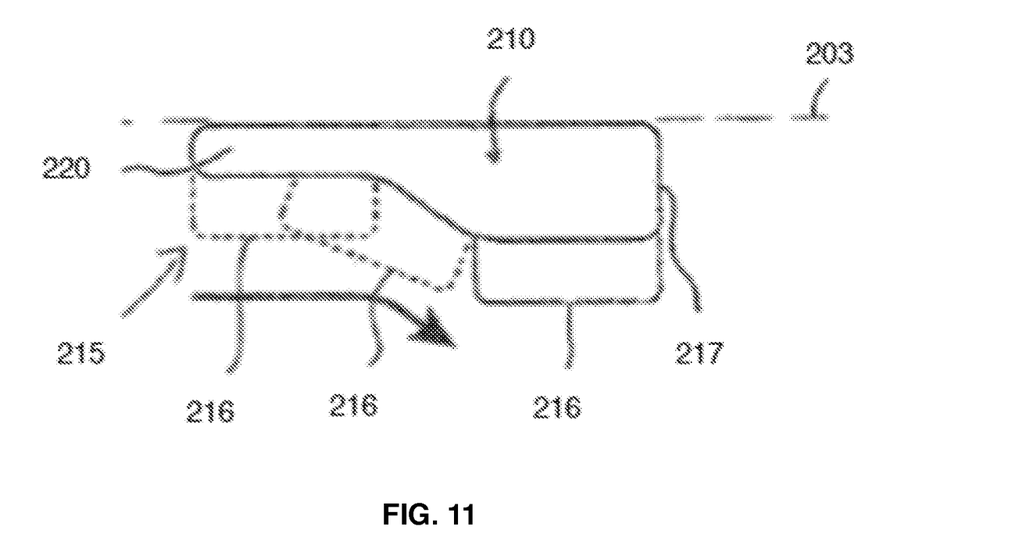
FIG. 11 is a schematic representation in vertical cross-section of a weigh system in accordance with one embodiment of the present invention.

Referring to FIG. 11, there is shown an alternative weighing system 215. The weighing system mounted to the base 203 underneath the housing, comprising a longitudinal body having an arm portion 220 ending with a shoulder portion 210, the longitudinal body being attached to a portion of the base 203 beneath the housing 211.

As shown in FIG. 11, a load sensor 216 is movable (in dotted outline) in the direction of the arrow, from a storage condition in arm portion 220 (shown in dotted outline) to, a weighing condition (shown in full outline) located on an end portion 217 of the shoulder 210.

Figures 12A, 12B:
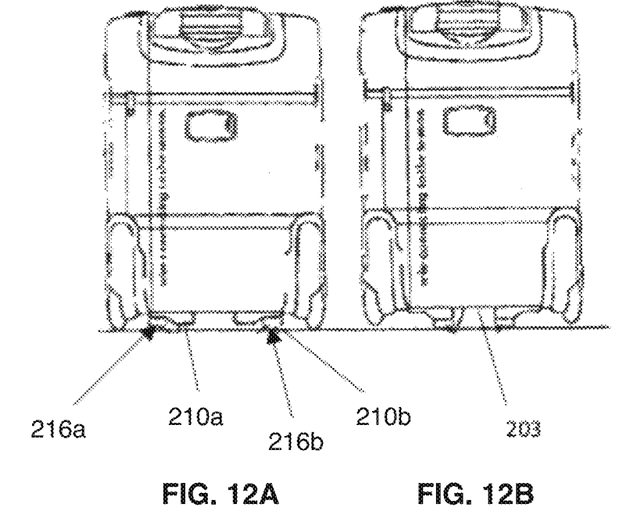
FIGS. 12A and 12B are a schematic representation in a side view a weigh system in accordance with FIG. 11 showing different weighing configurations.

Referring to FIGS. 12A and 12B, there is shown the weighing system 215 in a storage condition and weighing condition respectively including a pair of spaced apart longitudinal body portions mounted to the base 203 of the container. In a storage condition (see FIG. 12A) the load sensors 216a and 216b are located on or within a recess portion of the arm 220. In FIG. 12B the load sensors have both been moved in opposite directions along the arm towards the respective shoulders 210a and 210b in a weighing condition. As shown in FIG. 12A, in a storage condition the configuration of the weighing system in which the load sensors are stored along the ark portion, allow the wheels to engage the ground 207. In FIG. 12B when the load sensors are moved' along the arm portions into vertical alignment with the respective shoulders, the increase in height which results raises the base and wheels from frictional engagement with the ground. In this condition the load sensors engage the ground and allow weighing of the luggage.

Figure 13:
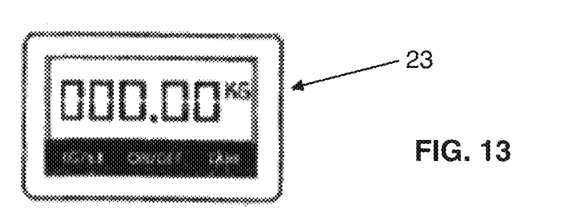
FIG. 13 is a plan view of a display used in the present invention.
Figure 15A:
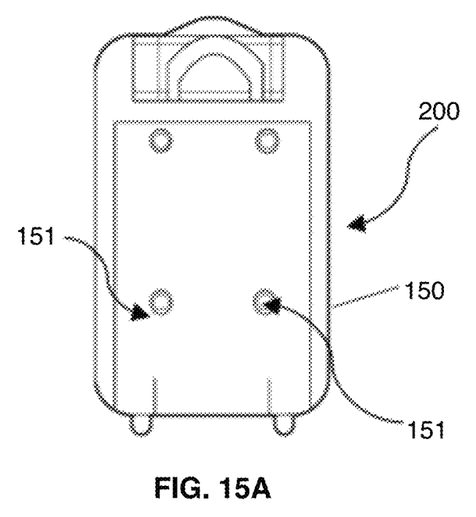
FIGS. 15A to 15L are schematics views of a weigh system in accordance with the present invention.
Figure 15B:
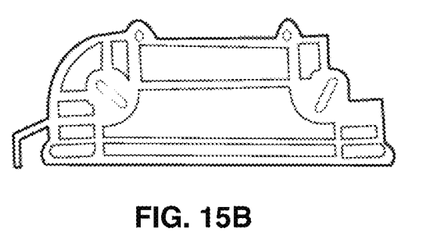
Figure 15C:
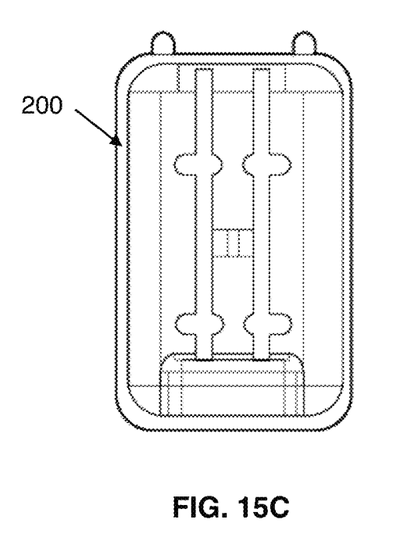
Figure 15D:
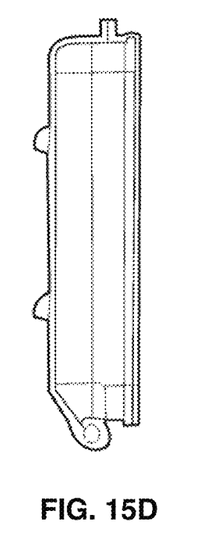
Figure 15E:
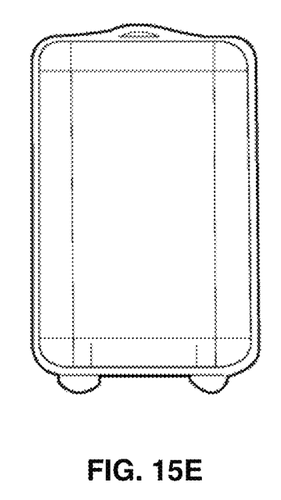

Referring to FIG. 13 there is shown an LCD display 23 which is operatively interconnected to the load sensors through a microprocessor (not shown). The display is attached to a top portion of the housing (see FIG. 15) in use and displays luggage weight measurement in real time when the weighing system is in a weighing condition.

Figure 14:
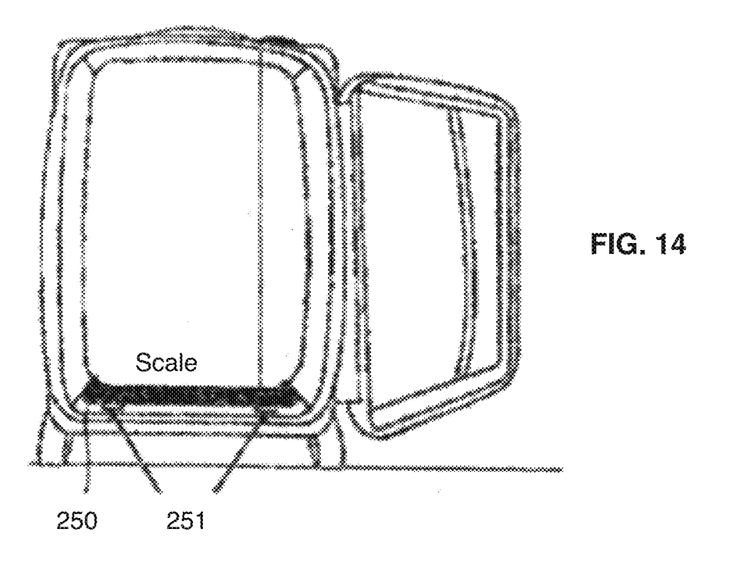
FIG. 14 is a schematic representation in side view of a weigh system in accordance with one embodiment of the present invention.

Referring to FIG. 14, there is shown a conventional suitcase having a hinged closure. In this embodiment, there is shown a further alternative weighing system comprising a base plate 250 mounted to one inside end of the suitcase. As shown, the weighing system in FIG. 14 also includes a pair of load sensors 251 located between the base plate and an inside portion of the suitcase. In this embodiment luggage articles can be weighed at any time as the bulk articles exert a mass against the base plate.

Referring to FIGS. 15A to 15H, there is shown a luggage and integrated weighing system 200 in accordance with the present invention. The luggage and integrated weighing system 200 includes a luggage case 150 having a body portion for receiving and storing luggage articles, and one or more weigh bodies 151 mounted to a portion of the luggage case for weighing the luggage case and articles stored in the body portion. In the embodiment shown in FIG. 15A the system 200 includes four spaced apart weigh bodies 151 which can rest on the ground or surface in a non-weighing condition.

The system 200 further includes a power circuit (not shown) including a microprocessor operatively connected to the weigh bodies, and a display means 153 on an upper portion of the luggage case interconnected to the microprocessor. In a weigh condition the weigh sensor 152 completes the power circuit and is calibrated to determine weight of the luggage case, and the display means receives information from the microprocessor for displaying a weigh output.

Figures 15F, 15G, 15H, 15I, 15J, 15K, 15L:
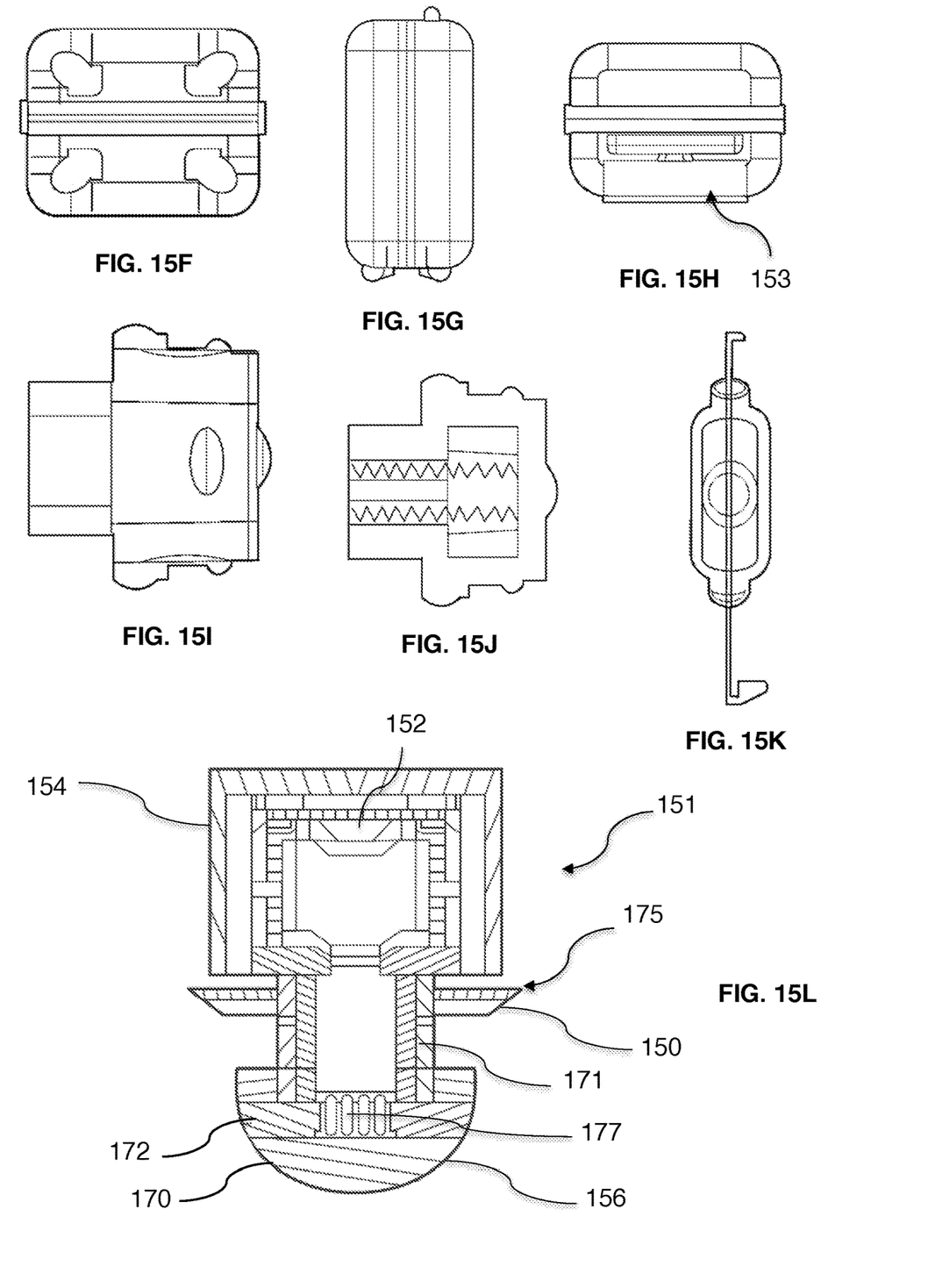

Each of the weigh bodies 151 (best shown in FIGS. 151 and 15L) include a weigh sensor housing 154 adapted for mounting to or within the luggage case, a weigh sensor 152 received within the housing, and a mushroom-shaped ground engaging member 156. The ground engaging member 156 includes a domed-shaped foot 170 and a pair of dependent spaced apart legs 171 whereby the legs are slidably movable within the weigh sensor housing.

Referring to FIG. 15L, there is shown a ground engaging member 156 in a weighing condition in which the foot 171 is extended from the weigh sensor housing for positive engagement with a ground surface. In this condition, the spaced apart legs 171 are aligned with and engage the weigh sensor, and the luggage case is supported by the foot members, so that the force exerted on the weigh sensor by the legs in proportion to the weight of the luggage can be determined.

In a non-weighing condition (not shown), the legs are deformed or deflected away from engagement with the weigh sensor and thereafter slidably received within the weigh sensor housing so that the domed foot can rest adjacent the weigh sensor housing.

As further shown in FIG. 15L, the weigh body includes a releasable locking means which biases alignment and operative engagement between the legs of the ground engagement member and the weigh sensor in a weighing condition. The locking means includes mating components on the weigh sensor housing and the ground engaging member. In a weighing condition the foot portion of the ground engagement member(s) extends from the weigh sensor housing for positive engagement with the ground, and as the legs slide upwardly within the housing a lower portion of the legs is brought into frictional engagement with the weigh sensor.

The ground engaging member(s) further include a release mechanism for releasing the legs from frictional engagement with the weigh sensor so that the legs can slide downwardly within the weigh housing. The release mechanism comprises a compressed spring 177 in a portion of the foot, operatively interconnected to the spaced apart legs, which biases the legs towards alignment with the weigh sensor.

The release mechanism includes a release structure 172 in the foot portion of the engagement member, and when the release structure is depressed against the compressed spring by exerting a force thereon, the legs can be deflected away from alignment with the weigh sensor and thereafter slidably received within the weigh housing in a non-weighing condition. In this condition the legs are no longer aligned with or in weighing engagement with the weigh sensor, and the foot 170 lies adjacent the weigh housing. In this non-weighing condition the foot or feet can provide stable support for the luggage case.

The weigh housing also includes a collar 175 which includes a shaped recess 176 for receiving a portion of the foot so as to insulate the weigh housing from exposure to water or moisture.

Figure 16:
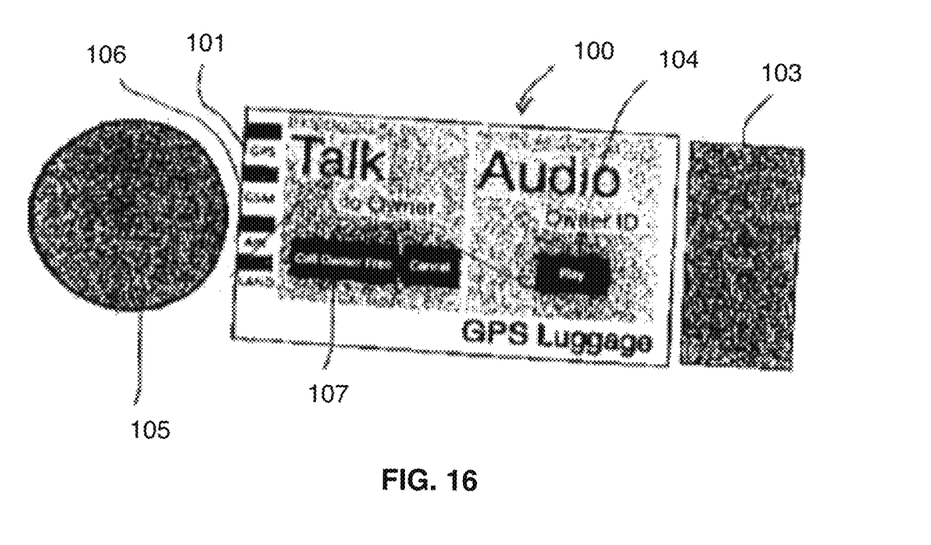
FIG. 16 is a schematic representation in vertical cross section of a weigh body forming part of a weigh system in accordance with an alternative embodiment of the present invention.
Figure 17:
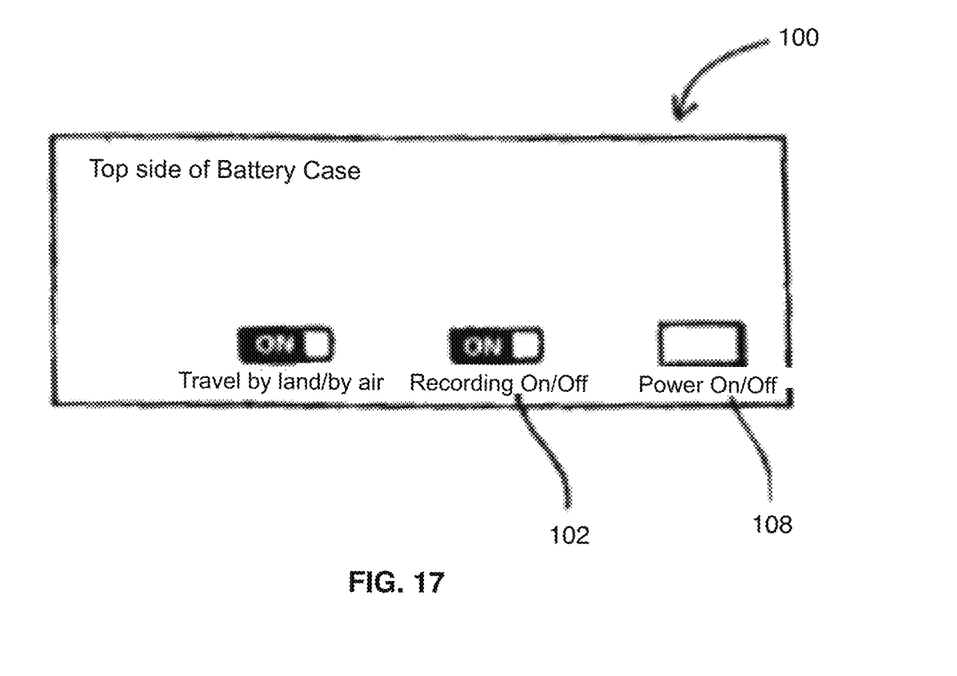
FIG. 17 is a schematic representation showing a display component of a further embodiment of the invention.

Referring to FIGS. 16 and 17 there is shown a further embodiment of the present invention. In this embodiment there is shown a display unit 100 used in the weigh system including tracking means 101 for allowing location of lost luggage. The tracking means includes:

(i) an audio recorder 102 for recording owner identification and details including name and address, and speaker 103 connected to a play function 104 for playing the recorded identification message;

(ii) a telecommunications means including a radio transmitter and receiver 105, and a GMS simcard 106, whereby the simcard includes the owners telephone contact so that actuating 'call owner' button 107 opens transmission; and (iii) GPS tracking system 101 powered by luggage weigh power supply 108, whereby the GPS is operable on land to transmit control signals relating to luggage position, and powered off while in air.

In a further embodiment (not shown), the luggage and integrated weighing system includes an electronic tamper detection and response system for providing evidence of unauthorised access to contents of the luggage. This is important to the extent that a traveler can obtain proof of any deliberate altering by removal or addition of contents from or to the luggage by persons other than the actual owner.

The tamper detection and response system comprises embedded electronic detection circuitry interconnecting the microprocessor of the weigh circuit with one or more detection sensors located on or within the luggage container and/or weigh sensors. In one preferred form, the weigh sensors can detect a change in weight and trigger the microprocessor circuit to emit an alarm and/or record the time of such a change.

Further, the detection/response system can include hardware such as a camera which is integrated to the detection circuitry, and upon sensing a change or unauthorised opening, the detection circuitry can trigger operation of the camera to take a photograph. Even further, the microprocessor can trigger alarm by telephone to owner.

Tamper detection mechanisms enable the hardware device to be aware of tampering and include:

Switches such as microswitches, magnetic switches, mercury switches, and pressure contacts to detect the opening of a device, the breach of a physical security boundary, or the movement of a particular component.

Sensors such as temperature and radiation sensors to detect environmental changes, voltage and power sensors to detect glitch attacks, radiation sensors for X-rays (used for seeing what is inside of a sealed or encapsulated device) and ion beams (often used for advanced attacks to focus on specific electrical gates within an integrated circuit).

Circuitry such as flexible circuitry, nichrome wire, and fiber optics wrapped around critical circuitry or specific components on the board. These materials are used to detect a puncture, break, or attempted modification of the wrapper. For example, if the resistance of the nichrome wire changes or the light power traveling through the optical cable decreases, the system can assume there has been physical tampering.

Response mechanisms may also be simpler, such as just logging the type of attack detected and the time it occurred, which can provide useful audit information and help with forensic analysis after an attack.

It should be understood that the above description is of a preferred embodiment and included as illustration only. It is not limiting of the invention. Clearly variations of the luggage and integral weigh system would be understood by a person skilled in the art without any inventiveness and such variations are included within the scope of this invention.

What is claimed is:

1. A luggage and integrated weighing system for weighing luggage on hard or soft surfaces in real time, the system comprising:

a luggage case including a body structure for receiving and holding articles for transport, the body having a closure on a portion thereof for opening and closing the body to allow insertion and removal of luggage articles;

at least one weigh body mounted to a portion of the body structure, the weigh body comprising:

a weigh sensor housing;

a weigh sensor mounted within the weigh sensor housing calibrated to determine weight of the luggage case;

a ground engaging member adjustably mounted within the weigh sensor housing moveable between a weighing condition and a non-weighing condition, wherein in the weighing condition a first portion of the ground engaging member engages the weigh sensor for weighing the luggage case, and a second portion engages the ground such that a force proportional to the weight of the luggage is exerted on the weigh sensor;

a power circuit including a microprocessor attached to the weigh sensor, whereby the microprocessor is programmed to receive input information from the weigh sensor in the weighing condition;

a display attached to an external surface of the body structure, the display being interconnected to the microprocessor for receiving and displaying weigh information;

wherein in the weighing condition the weigh sensor completes the power circuit and the weight of the luggage is determined by the weigh sensor and a weight measurement is displayed on the display, and wherein in the non-weighing condition the ground engaging member is adjustably disengaged from the weigh sensor;

wherein the second portion of the ground engaging member is a ground engaging head and the first portion of the ground engaging member comprises dependent legs, wherein the legs are slidably received within the weigh sensor housing and whereby the ground engaging head lies adjacent the weigh sensor housing in the non-weighing condition with the legs resting adjacent the weigh sensor;

wherein the ground engaging head includes a releasable locking assembly whereby the ground engaging head is releasably seated adjacent the weigh sensor housing in the non-weighing condition; and wherein the releasable locking assembly includes a depression member in the ground engaging head biased towards a locking condition whereby in the non-weighing condition the depression member engages a shoulder portion on the weigh sensor housing so as to lock the ground engaging head adjacent the weigh sensor housing.

2. A luggage and integrated weighing system for weighing luggage according to claim 1, wherein the second portion of the ground engaging member at least partially lifts the luggage case into weighing engagement with the weigh sensor whereby the weight of the luggage including articles within the body structure of the luggage case is determined and displayed substantially independent of hard or soft surfaces, and whereby when contact occurs between the ground engaging member and the weigh sensor in the weighing condition, the power circuit is completed and measurement of weight provided by the weigh sensor.

3. A luggage and integrated weighing system for weighing luggage according to claim 1, wherein the weigh body further comprises a guide structure for aligning and locating the first portion of the ground engaging member in engagement with the weigh sensor in the weighing condition.

4. A luggage and integrated weighing system for weighing luggage according to claim 3, wherein the guide structure comprises mating components on the weigh sensor housing and the ground engaging member which bias the first portion of the ground engaging member towards engagement with the weigh sensor in the weighing condition.

\* \* \* \* \*